(12) United States Patent
Kostadinovich

(10) Patent No.: US 8,558,896 B2
(45) Date of Patent: Oct. 15, 2013

(54) REMOTE NETWORK VIDEO CONTENT RECORDER SYSTEM

(75) Inventor: Michael Kostadinovich, New York, NY (US)

(73) Assignee: Anthony V. Pugliese, III, Gulf Stream, FL (US)

( * ) Notice: Subject to any disclaimer, the term of this patent is extended or adjusted under 35 U.S.C. 154(b) by 0 days.

(21) Appl. No.: 13/308,903

(22) Filed: Dec. 1, 2011

(65) Prior Publication Data
US 2012/0069200 A1 Mar. 22, 2012

Related U.S. Application Data

(63) Continuation of application No. 11/290,863, filed on Nov. 30, 2005, now abandoned.

(60) Provisional application No. 60/673,280, filed on Apr. 20, 2005.

(51) Int. Cl.
| | |
|---|---|
| *H04N 5/225* | (2006.01) |
| *H04N 7/18* | (2006.01) |
| *H04N 5/232* | (2006.01) |
| *H04N 5/76* | (2006.01) |
| *H04N 7/173* | (2011.01) |

(52) U.S. Cl.
USPC .............. 348/207.1; 348/143; 348/207.11; 348/211.99; 348/211.3; 348/231.2; 348/231.3; 725/105; 725/109

(58) Field of Classification Search
USPC .............. 348/143–159, 207.1–207.11, 348/211.99–211.14, 222.1, 231.99–231.6; 725/105, 109–117
See application file for complete search history.

(56) References Cited

U.S. PATENT DOCUMENTS

| | | | | |
|---|---|---|---|---|
| 6,698,021 | B1 * | 2/2004 | Amini et al. | 725/105 |
| 6,750,913 | B1 * | 6/2004 | Noro et al. | 348/333.02 |
| 6,856,346 | B1 * | 2/2005 | Kobayashi et al. | 348/211.99 |
| 8,004,561 | B2 * | 8/2011 | Mottur et al. | 348/143 |
| 8,089,520 | B2 * | 1/2012 | Ko et al. | 348/211.1 |
| 8,115,819 | B2 * | 2/2012 | Anderson | 348/211.1 |
| 8,302,142 | B2 * | 10/2012 | Takanezawa | 725/105 |
| 8,312,133 | B2 * | 11/2012 | Kurosawa | 709/224 |
| 2001/0045983 | A1 * | 11/2001 | Okazaki et al. | 348/211 |
| 2002/0003575 | A1 * | 1/2002 | Marchese | 348/231 |
| 2003/0229711 | A1 * | 12/2003 | Cho et al. | 709/231 |
| 2004/0051787 | A1 * | 3/2004 | Mutsuro et al. | 348/211.99 |
| 2004/0078825 | A1 * | 4/2004 | Murphy | 725/109 |
| 2004/0242220 | A1 * | 12/2004 | Matsunaga | 455/423 |
| 2005/0010649 | A1 * | 1/2005 | Payne et al. | 709/217 |
| 2006/0161960 | A1 * | 7/2006 | Benoit | 725/105 |
| 2006/0238619 | A1 * | 10/2006 | Takahashi | 348/207.1 |

(Continued)

Primary Examiner — Michael Osinski
(74) Attorney, Agent, or Firm — Blank Rome LLP

(57) ABSTRACT

A concept and method for the remote management of and recording of digital video content from a remote IP video camera to an application server via the internet. The recorder system comprises a user device capable of running a user interface, a server running a communications interface, a recorder module, and a digital recording device, and at least one remote IP camera. Upon system initialization, a recorder object and an associated unique ID for the recorder instance are transmitted with the user interface to the user device. A remote user of the device may request a video image from an associated remote camera to be sent to the server where it is recorded on the recording device. The image does not transmit to the user device, minimizing bandwidth requirements on the control side. The server provides a safe, secure and network-optimized environment for capturing the recording.

12 Claims, 4 Drawing Sheets

(56) References Cited

U.S. PATENT DOCUMENTS

| | | | |
|---|---|---|---|
| 2006/0279628 A1* | 12/2006 | Fleming | 348/143 |
| 2007/0113255 A1* | 5/2007 | Kurosawa | 725/105 |
| 2008/0303903 A1* | 12/2008 | Bentley et al. | 348/143 |
| 2009/0051767 A1* | 2/2009 | Iwamura | 348/143 |
| 2011/0279694 A1* | 11/2011 | Ohi et al. | 348/211.3 |

* cited by examiner

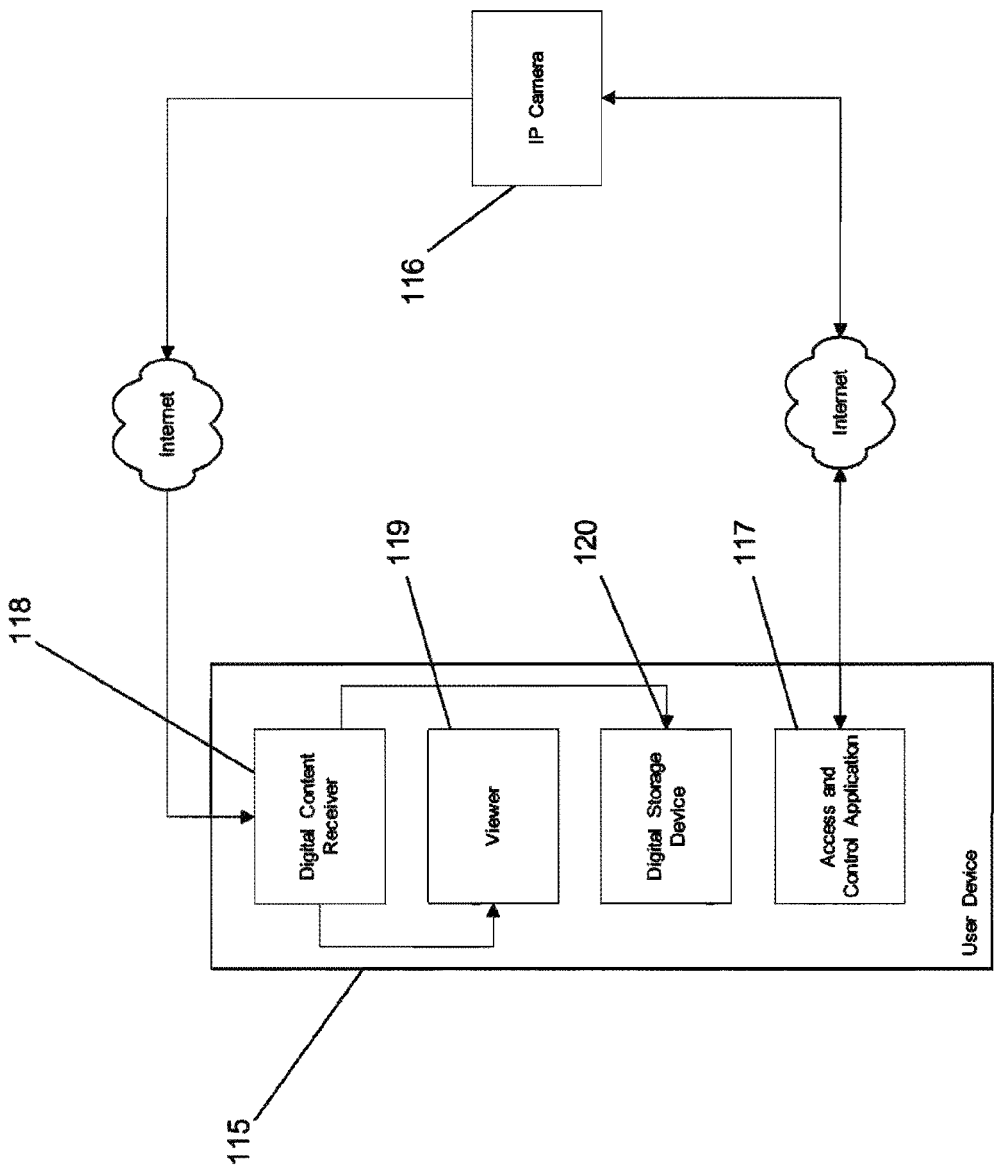

REMOTE NETWORK VIDEO CONTENT RECORDER SYSTEM

RELATED APPLICATIONS

This application is a continuation of U.S. application Ser. No. 11/290,863, filed Nov. 30, 2005, entitled "Remote Network Video Content Recorder System;" which claims benefit of priority of U.S. Provisional Application Ser. No. 60/673,280, filed Apr. 20, 2005. Both of the above-identified related applications are incorporated herein by reference.

FIELD OF THE INVENTION

The present invention relates to the field of remote video camera operations. More specifically, the present invention is a concept and method for the management and recording of digital video content from a remote IP video camera to an application server via the internet.

BACKGROUND OF THE INVENTION

Remote controlled video capture devices comprising analog cameras linked by a dedicated network to camera control devices, monitors and recorders located in a control center are well known as a method of providing surveillance for security of buildings and other facilities. As shown in FIG. 1A, a typical dedicated system comprises a user device 101 running a client application functioning as a user agent 102 which controls an analog camera 103 via a communications interface 104 running on a server 105. Communications channels between these dedicated devices typically comprise closed-network ethernet connections, limiting the scaling of the system to only those devices so provisioned.

Under this closed system, user agent 102 issues instructions 106 NB to camera 103, which are interpreted via interface 104. The camera returns camera status information 107A/B, among other operational data to user device 101, again using communications interface 104.

The typical dedicated surveillance system further comprises a viewer 108 on the user device and an analog-to-digital converter 109 coupled to a digital video content storage device 110 on the server. Among the instructions 106 issued by the user agent are commands to either view or record the video content captured by camera 103. In response to either of those instructions, video content 111 is sent from the camera to the analog-to-digital converter 109 on the server. If the instruction was for viewing, the video content is formatted for viewing and is sent as video viewing content 112 to viewer 108. If the instructions included a request for recording, the converter 109 passes the converted content to storage device 110 for storage.

Also well known are video systems commonly referred to as "web cams" (not shown) which have been developed to suit more personal usage requirements. These systems are typically simple digital cameras which send their content to a dedicated computer receiver, from where the content is prepared for distribution via the internet to other parties. These are not truly "web" cameras, in as much as they are not truly accessible directly through internet connections. That is they cannot be controlled by a remote accessing party without the intervention of the dedicated computer.

While these systems provide a user the opportunity to manage (in the case of the surveillance system of FIG. 1) or at least receive (in the case of the web-cams) image captures from remote cameras, neither of them provides a user with the ability to control a remote camera to which the user is not directly connected.

There are other systems, as shown in FIG. 1B which provide a remote user 115 with internet access to a remote IP camera 116. The user device (an example of which might be a common desktop PC), comprises an access and control application 117, a digital content receiver 118, a video content viewer 119 and a video content recording device 120. All camera access and manipulation operations as well as video content receipt, monitoring and storage are managed and performed by and on the user device 115. This system, while providing a user with the ability to connect to a remote device via the internet, does not tend to provide "operation critical" deployments needed for surveillance operations. This is because user-device-based camera access and recording embodiments are inherently less stable and reliable than the dedicated systems shown in FIG. 1, in which system optimization and resource management is handled by a dedicated system server 105.

In addition, none of the above systems is extendible to environments wherein a thin client might be employed to remotely manage and even monitor surveillance operations of a group of remote, network-ready IP video cameras, located in diverse geographical locations, and still maintain the capability to record video content from those operations. Therefore, there is a need for improvement in the art of surveillance operations using the developing technology of IP video cameras and thin client/server applications.

SUMMARY OF THE INVENTION

A remote network video content recorder system is disclosed comprising a concept and method for downloading, via the internet, IP video content from a remotely located network video camera to a digital video storage device (DVSD) located on an also remote server. The invention further comprises said video downloading under the direction of a user interface which is associated with a recorder communications interface at the server. The recorder communications interface is typically an HTTP-based API for a recorder module, also located at the server. The recorder module creates and utilizes user interface-camera-recorder module associations as well as internet-operable data communications and video transmission channels to effect the transmission and recording of digital video content.

The inventive concept permits a client application, functioning as a user agent on a web-enabled user device, to request a recording of live digital video content taken from an internet-linked IP video camera, and to have that recording made on a digital recording system located on a remote web application server. The recorder system does not require the client application (i.e., the user device) to receive or view the video content, but simply permits the user device to request and control the recording of the video content, transmitted via the internet, to a remote, reliable and secure location.

Under this architecture, a user device, server and any cameras comprising an instance of the recorder system are not operatively associated with each other in a dedicated manner, but become operatively associated with each other at the direction of a user of the user device, based on association algorithms communicated via internet. Thus, the utility and flexibility of the system has the potential to be far greater than that of a closed system of FIG. 1A, wherein the system comprises a limited number of dedicated camera units.

Also, because the client does not have to view or record the video content it is directing the recording of, the inventive concept minimizes bandwidth requirements associated with the remote control of the system. It thus permits the use of thin clients as user agents for exercising that control in applications such as surveillance systems. Options for receiving or viewing of the video content by the user device, if desired, may be exercised by known viewers (e.g., "Quicktime") which may be associated with the camera and the user device as independent plug-ins.

Also, since the recorder system operates by permitting the remote user to direct recording operations through a server application, the server supporting the application is able to perform overall system optimization and resource management associated with any and all active user requests. Thus, the reliability and efficiency of the recording system operations are greatly enhanced as compared to the traditional recording system of FIG. 1B, which operates from a single remote user device.

The recorder module resides on the server and upon initialization, sends a user interface to a requesting user. The recorder application may be integrated into a third-party application. In this case, the initialization may be initiated via a link embedded within a user agent associated with the application operating on a remote thin client device. Alternatively, the recorder application may exist as an independent application where it may be requested directly, for example from a desktop icon.

BRIEF DESCRIPTION OF THE DRAWINGS

Exemplary embodiments of the invention are discussed hereinafter in reference to the following drawings, in which:

FIG. 1B is a network diagram illustrating a prior art implementation of a video content recording application involving a digital camera in a remote user-device-based environment over the Internet.

DETAILED DESCRIPTION OF PREFERRED EXEMPLARY EMBODIMENTS

Figure 1A:
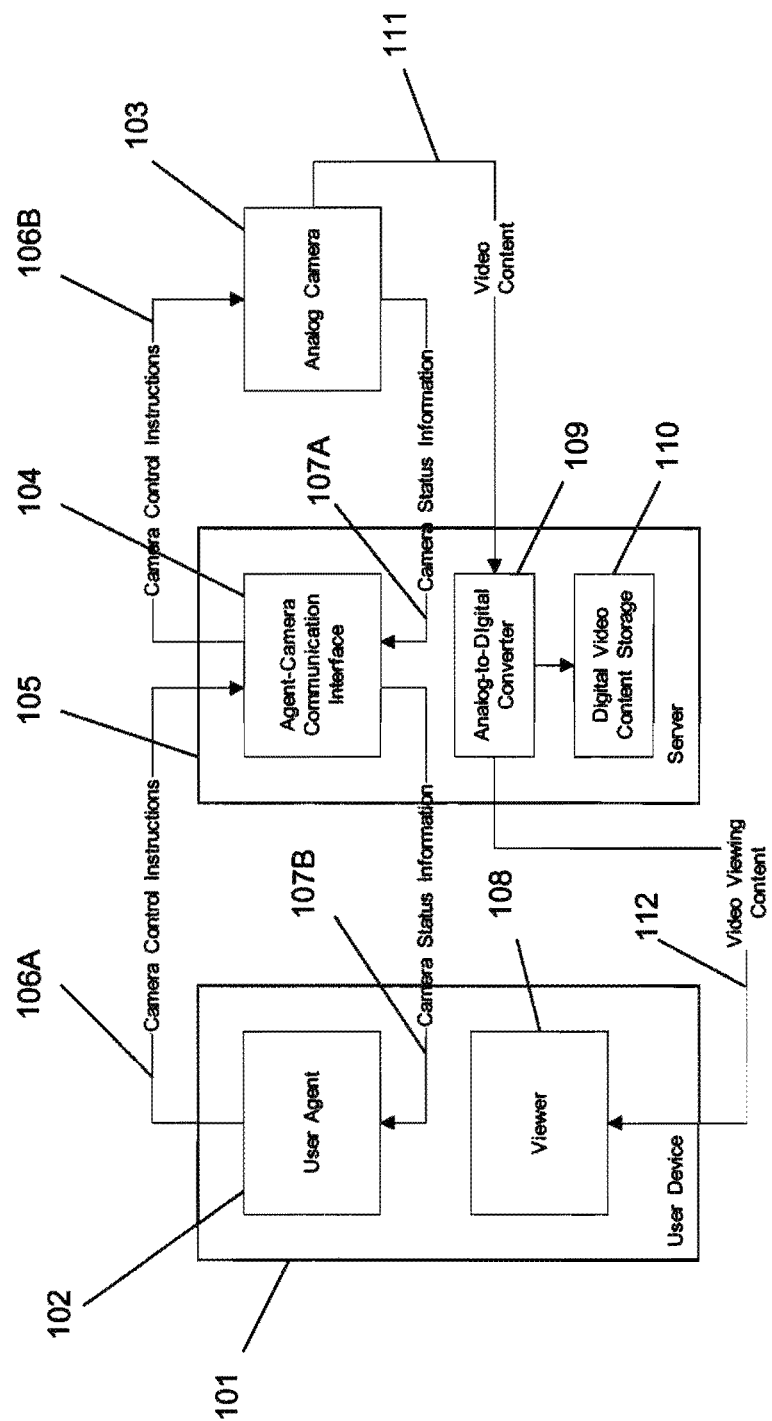
FIG. 1A is a network diagram illustrating a prior art implementation of a video content recording application involving an analog camera type in a dedicated server-controlled environment over a closed network.
Figure 2:
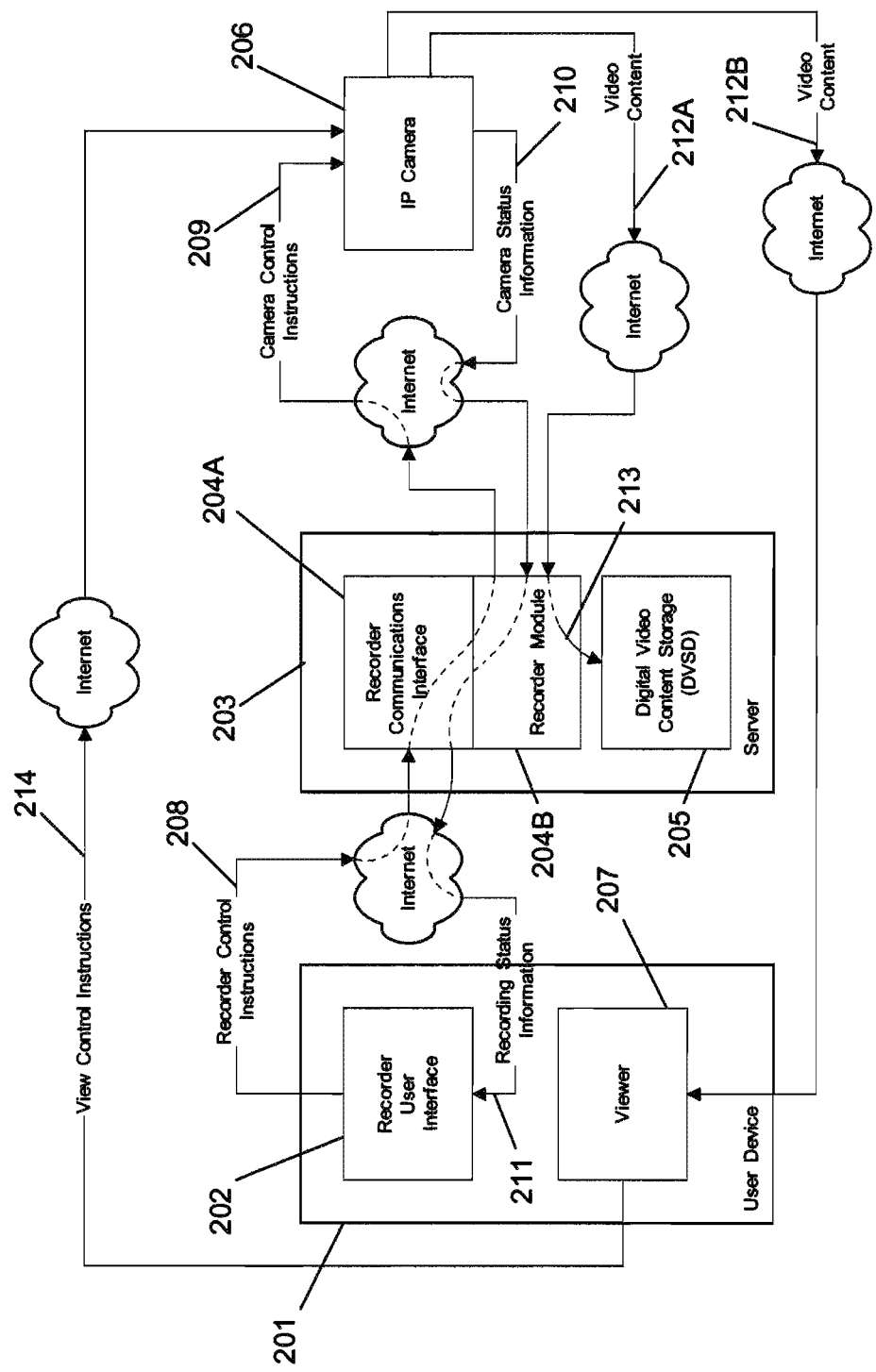
FIG. 2 is a network diagram illustrating a generic implementation of a video content recording application involving a digital camera in a remote user-device-controlled, server-managed environment over the internet.

As shown in FIG. 2, the recorder system concept comprises a user device 201 hosting a recorder user interface 202 which is operatively connected over the internet with an application server 203 running a recorder communications interface 204A, a recorder module 204B and a digital video storage device (DVSD) 205. The system further comprises one or more network (IP) video cameras 206 having an IP address, and which may exist at remote locations relative to both the user device and the server. Utilization of the invention comprises permitting a user of the user device to initialize the recorder system, and to request video data captured by the IP camera to be downloaded via the internet to the DVSD where it is saved as a digital recording.

The recorder system may exist as a stand-alone application or it may be operatively integrated as a module into a third-party application. FIG. 2 also depicts a viewer 207 which is independent of the recorder system, but which is shown to indicate options for such third-party systems integration.

The recorder module itself is an algorithm which provides two primary services. First, the recorder module establishes an association between itself, its system camera or cameras and the recorder user interface upon receiving a recorder-initialization request from the user device. The initialization of the recorder system may be requested from within a user agent running on the device (via a link), or apart from it (e.g., by clicking a desktop icon). Second, at the request of a user of the user device, which is delivered via the recorder UI to the recorder module via the recorder communications interface, the algorithm controls the downloading of the media from the camera to the server.

In an exemplary embodiment, the recorder user interface 202 is used to access and control the recorder module after initialization. It sends recorder control instructions 208, via the internet, to recorder communications interface 204. Recorder control instructions comprise recorder module management requests, for example, requests to start or stop the recording, to get status information, etc. The recorder communications interface is a web-based API, which accepts instructions 208 in HTTP format and passes them to the recorder module for processing.

The recorder module 204B processes the instructions and delivers camera control instructions 209, again via the Internet, to camera 206. Camera control instructions 209 comprise access and management commands including, for example, instructions to open or close the camera connection, specify the video format (MPEG4, Quicktime, etc.), adjust the frame rate, send camera status information and send video content.

Upon a command from the recorder module (received via an instruction 209) to open the camera connection, IP camera 206 constantly transmits camera status information 210 back to the recorder module. The recorder module receives the camera status information and integrates it into a stream of overall recording status information 211, which it passes through communications interface 204 to user interface 202. This recording status information may include the current frame rate, elapsed recording time, size of the recorded clip, etc., but it does not include video content.

Upon a request to record from camera 206, which may be sent as a recorder control instruction 208 and processed into a camera control instruction 209, the camera sends video content 212A to recorder module 204B. The video content includes live video images, which may be transmitted in the specified video format and quality, as well as frame information associated with each image. The recorder module process the video content and delivers it as processed video content 213 for recording onto DVSD 205.

In an implementation of the recorder being used in conjunction with a third-party application, as shown in FIG. 2, said third-party application may comprise a viewer program 207 which, through a view control instruction 214, requests to view the video content of camera 206. In this implementation, the video content 212B is sent directly to viewer 207. Video content 212B may or may not be the same data, format and quality as that of video content 212A.

Figure 3:
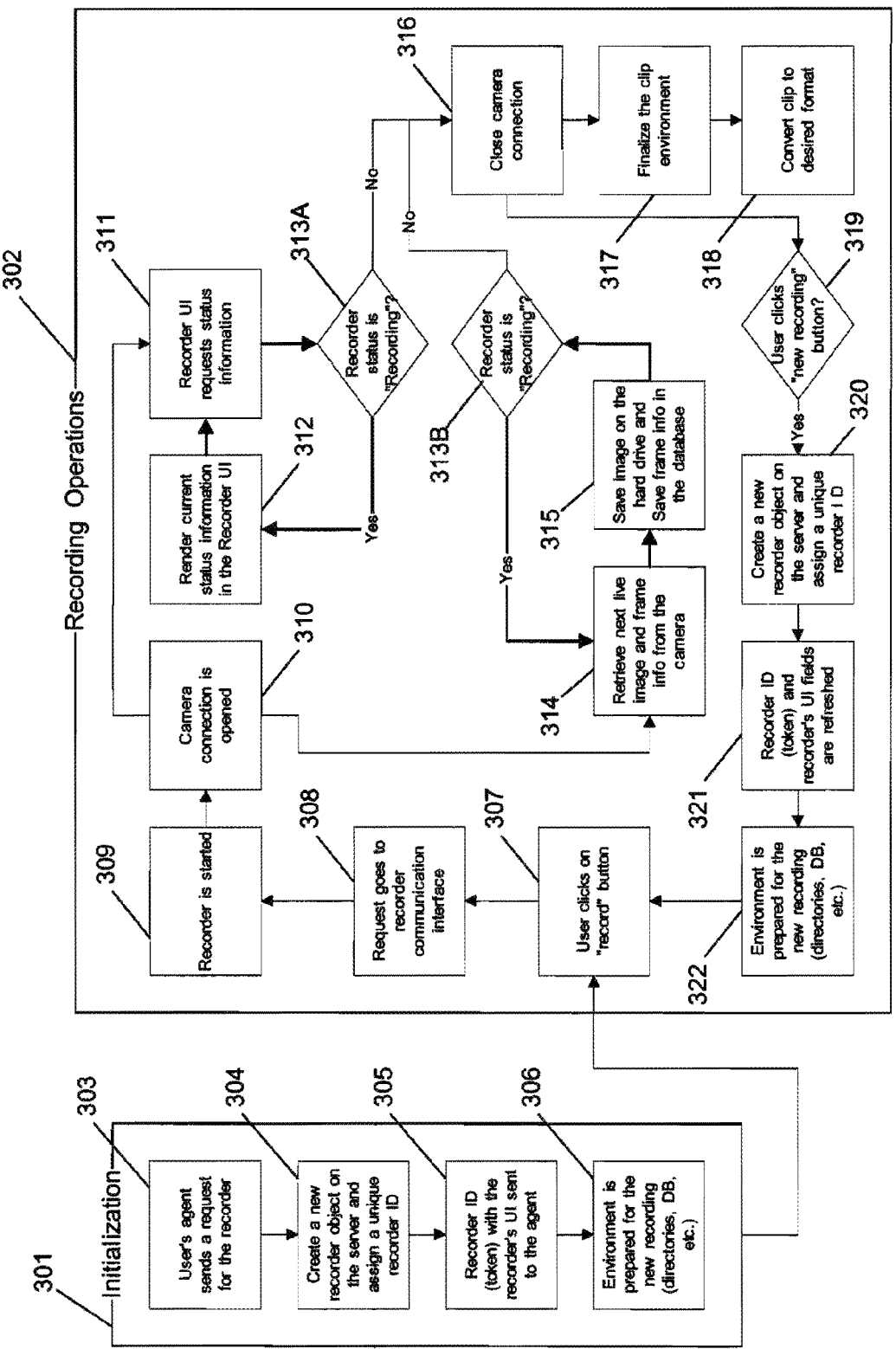
FIG. 3 is a process flow diagram depicting the two primary functional processes of the recorder system: the initialization and recording operations.

FIG. 3 is a flow diagram depicting the two primary functional processes of the recorder. The first process comprises the initialization 301 of the recorder system and the second process comprises its recording operation 302, which may take place after initialization.

Initialization may be initiated at user device 201. In step 303, the device's operative user agent sends a request to recorder module 204B via communications interface 204A to initialize the module. This request may be accomplished by clicking on an HTML link within a user agent directing the request to recorder communications interface 204. The module initializes, creating a recorder instance. Alternatively, a previously established schedule of recording may prompt a request to initialize the recorder system, either from within the recorder module or from within a user agent.

Regardless of the origin of step 303, in step 304 the module creates a new recorder object on the server and assigns a unique recorder ID for the instance. In step 305 the recorder user interface is sent to the user agent along with the new recorder ID (referred to as a "token"). On the server, in step 306, an environment is prepared for the new recording. This environment comprises new directories, a data base and so on. This completes the initialization process. The user agent now displays the recorder user interface, comprising a list of cameras available to the user for recording from and which is ready to initiate and manage a recording from one of them.

To begin the recording operations, the user selects a camera and its desired operating parameters (e.g., position, zoom, quality, etc.) and clicks on the "record" button (step 307). The request to record is sent to the recorder communication interface 204 in step 308. The communication interface causes the recorder module to commence recorder operations (step 309), whereupon in step 310, the requested camera connection is opened.

Once the camera connection is opened, two simultaneous recording operation processes begin and continue until the recording is stopped. The first process, referred to as the status loop, begins at step 311. In this step, the recorder user interface requests status information. This request is made via recorder control instructions 208. If, in step 313A, a check of the recorder status indicates "recording", the status information is returned via the recorder status information stream 210 where it received and rendered on the user interface 202 in step 312. This status request process continues, beginning again with step 311, until a check of the recorder status no longer indicates that it is recording.

The second process which takes place while the camera connection is opened comprises the actual video recording loop. It begins at step 314 where the recorder module 204A retrieves the next live image and its associated frame information from the camera. Both the image and its frame information is received via video content path 212A. In step 315, the video content is saved on the hard-drive and the frame information is saved in the database opened during step 306. Next, in step 313B, the recorder status is again examined. If the recorder is still recording, the process returns to step 314 where it continues the recording process as described above. If the recorder is no longer maintaining a status of recording, the process completes.

When the recorder status is no longer "recording", either because the user has terminated the recording or because a scheduled recording time (a feature accessed via the recorder user interface) has expired, both the status loop and the recording loop terminate. Upon termination, the overall recording operation process passes to step 316, wherein the camera connection is closed.

At this point, the process finalizes the video clip environment (step 317) and then in step 318 converts the clip to a format selected by the user via the user interface 202. Also, at this point, the process holds, pending a request for another recording.

In step 319, the process checks to see if the user has clicked the "new recording" button on the recorder user interface. If so, the process proceeds to the creation of a new recorder instance. In step 320, the recorder module creates a new object and recorder ID. Then in step 321, new token is sent to the recorder user interface as it is refreshed on the user device. Then, as in step 306 above, at step 322, the environment is prepared for the new recording. The process then passes back to step 307 where the recording operations begin again.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A system of recording IP video camera content comprising:
at least one IP video camera;
an application server at a location remote from the at least one IP camera, the server comprising:
a recorder module which is operatively associated via a first association with
a recorder communications interface which is operatively associated via a second association with
a digital video storage device;
wherein said recorder module is operatively associated via a third association with the at least one IP video camera, wherein a first and a second separate and distinct stream of information originating from each of said at least one IP video cameras is transmitted via said third association to said recorder module; and
a user device at a location remote from both the at least one IP camera and the application server, the user device including a recorder user interface and being operatively associated via a fourth association with said recorder communications interface and via a fifth association with said at least one IP video camera;
wherein a third separate and distinct stream of information originating from each of said at least one IP video camera is transmitted via said fifth association to said remote user device,
wherein said third, fourth, and fifth associations exist via the internet, wherein system initialization requests are sent from the user device to the recorder module via the first and the fourth associations, and a response by the recorder module to said system initialization request comprises the steps of: creating of a recorder instance comprising a recorder object and a unique recorder ID; and a user interface; and transmitting via said first and fourth associations of said unique recorder ID and said user interface to said user device; said unique recorder ID and said user interface enabling said user device to request video content of said at least one IP video camera to be delivered from said at least one IP video camera to said digital video storage device, and wherein said system executes a method of recording said video content comprising the steps of: initializing said system; and recording of said video content of said at least one IP video camera, comprising: receiving a recorder control instruction by said recorder module via said fourth and first associations to record said video content of said at least one IP video camera; receiving a camera control instruction by said at least one IP video camera via said third association to open a connection with said recorder module and to transmit said video content of said at least one IP video camera and camera status information of said at least one IP video camera separately, wherein the video content is transmitted via said first separate and distinct stream of information originating from each of said at least one IP video camera to said recorder module, wherein said video content is processed and delivered for recording onto said digital video storage device, and said camera status information is transmitted via said second separate and distinct stream of information originating from each of said at least one IP video camera to said recorder module; periodic delivering said camera status information to said recorder module; periodic delivering said video content to said recorder module; generating recorder status information based in part on said camera status information and periodic delivering said recorder status information to said user interface by said recorder module via said recorder communications interface; periodic delivering said video content to said digital video storage device by said recorder module; and continuing said periodic deliveries until said recorder status information no longer indicates that said system is recording, subsequent to which said connection to said camera is closed; an environment associated with said video content stored in said digital video storage device is finalized; and said video content stored in said digital video storage device is converted to a desired format.

2. The system of claim 1, wherein the system does not require that the user device receive, view or record video content, but permits a user of the user device to request and control recording of the video content transmitted via the internet to the application server, whereby the system minimizes bandwidth requirements associated with remote control of the system, thereby permitting that the user device, which exercises remote control of the system, be a thin client.

3. The system of claim 1, wherein the at least one IP video camera, the application server and the user device are not operatively associated with each other in a dedicated manner, but become operatively associated with each other at direction of a user of the user device based on association algorithms communicated via the internet.

4. The system of claim 1, wherein the recorder module is an algorithm that establishes an association with the at least one IP video camera, the application server and the user device upon receiving a recorder-initialization request from the user device, and that controls downloading and recording of video content from the at least one IP video camera to the digital video storage device upon receiving a request from a user of the user device delivered via the recorder communications interface.

5. The system of claim 1, wherein the user device further comprises a viewer, wherein view control instructions are sent from the user device to the at least one IP video camera via the fifth association, wherein video content is sent directly from the at least one IP video camera to the viewer via the fifth association, separate and distinct from video content sent from the at least one IP video camera to the digital video storage device via the third association, and wherein the video content sent to the viewer via the fifth association does not include the same data, format and quality as that of video content sent to the digital video storage device via the third association.

6. A system for recording IP video camera content comprising:
at least one IP video camera operatively associated through a first computer network to
a remote server, said server comprising:
a recorder communications interface which is operatively associated via a first association with
a recorder module which is operatively associated via a second association with a digital video storage device;
a remote user device operatively associated via a second computer network with said remote server via said recorder communications interface, wherein said remote user device displays a recorder user interface generated by said remote server, wherein said remote user device is further operatively associated via a third computer network with said at least one IP video camera;
wherein said system receives user input from said user device, transmits said user input via said second computer network to said recorder communications interface of said server, opens a connection between said at least one IP video camera and said recorder module, transmits a first and a second data stream from said at least one IP video camera to the recorder module, and transmits a third data stream from said at least one IP video camera to the user device; and
wherein said first, second, and third computer networks comprise partially the internet, wherein system initialization requests are sent from the user device to the recorder module via said first association and said second computer network, and a response by the recorder module to said system initialization request comprises the steps of: creating of a recorder instance comprising a recorder object and a unique recorder ID; and a user interface; and transmitting via said first association and said second computer network of said unique recorder ID and said user interface to said user device; said unique recorder ID and said user interface enabling said user device to request video content of said at least one IP video camera to be delivered from said at least one IP video camera to said digital video storage device, and wherein said system executes a method of recording said video content comprising the steps of: initializing said system; and recording of said video content of said at least one IP video camera, comprising: receiving a recorder control instruction by said recorder module via said second computer network and said first association to record said video content of said at least one IP video camera; receiving a camera control instruction by said at least one IP video camera via said first computer network to open a connection with said recorder module and to transmit said video content of said at least one IP video camera and camera status information of said at least one IP video camera separately, wherein the video content is transmitted via said first separate and distinct stream of information originating from each of said at least one IP video camera to said recorder module, wherein said video content is processed and delivered for recording onto said digital video storage device, and said camera status information is transmitted via said second separate and distinct stream of information originating from each of said at least one IP video camera to said recorder module; periodic delivering said camera status information to said recorder module; periodic delivering said video content to said recorder module; generating recorder status information based in part on said camera status information and periodic delivering said recorder status information to said user interface by said recorder module via said recorder communications interface; periodic delivering said video content to said digital video storage device by said recorder module; and continuing said periodic deliveries until said recorder status information no longer indicates that said system is recording, subsequent to which said connection to said camera is closed; an environment associated with said video content stored in said digital video storage device is finalized; and said video content stored in said digital video storage device is converted to a desired format.

7. The system of claim 6, wherein said first data stream carries video content generated by said at least one IP video camera, said second data stream carries camera status information of the at least one IP video camera, and said third data stream carries video content generated by said at least one IP video camera that is separate and distinct in data, format or quality from said video content transmitted by said first data stream.

8. The system of claim 6, wherein said recorder user interface is in the form of a web page.

9. The system of claim 6, wherein the remote user device further comprises a viewer program, wherein view control instructions are sent from the user device directly to the at least one IP video camera via the third computer network, wherein video content is sent directly from the at least one IP video camera to the viewer via the third data stream separate and distinct from video content sent from the at least one IP video camera to the digital video storage device via the first computer network, and wherein the video content sent to the viewer via the third data stream does not include the same data, format and quality as that of video content sent to the digital video storage device via the first computer network.

10. The system of claim 6, wherein the system does not require that the remote user device receive, view or record video content, but permits a user of the remote user device to request and control recording of the video content transmitted via the first computer network to the remote server, whereby the system minimizes bandwidth requirements associated with remote control of the system, thereby permitting that the remote user device, which exercises remote control of the system via the second computer network, be a thin client.

11. A method for recording IP video camera content, the method comprising the steps of:
associating at least one IP video camera through a first computer network to a remote server, said server comprising:
a recorder communications interface which is operatively associated via a first association with
a recorder module which is operatively associated via a second association with a digital video storage device;
generating a recorder user interface by said server;
displaying said recorder user interface on a remote user device which is operatively associated via a second computer network with said server via said recorder communications interface;
receiving user input from said user device, wherein said user input includes recorder control instructions;
transmitting said user input via said second computer network to said recorder communications interface of said server;
opening a connection between said at least one IP video camera and said recorder module; and
receiving a first data stream carrying video content at said recorder module from said at least one IP video camera;
recording said first data stream on said digital video storage device;
receiving a second data stream carrying camera status information of said at least one IP video camera from said at least one IP video camera to said recorder module;
integrating said second data stream into a fourth data stream and transmitting said fourth data stream via said recorder communications interface to said user interface, wherein said fourth data stream carries recorder status information;
associating said at least one IP video camera through a third computer network to said remote user device, said remote user device further including a viewer program;
receiving further user input from said user device, wherein said further user input includes view control instructions;
transmitting said further user input via said third computer network directly to said at least one IP video camera;
directly transmitting video content from said at least one IP camera to said viewer program via said third computer network via a third data stream in response to said further user input, and wherein, in view of the view control instructions of the further user input, the video content sent via the third data stream does not include the same data, format and quality as that of video content sent via the first data stream;
wherein said first, second, and third computer networks comprise partially the internet and wherein said remote user device is a thin client.

12. The method of claim 3, wherein the at least one IP video camera, the remote server and the remote user device are not operatively associated with each other in a dedicated manner, but become operatively associated with each other at direction of a user of the user device based on association algorithms communicated via the internet.

* * * * *